(12) United States Patent
Tsilfidis et al.

(10) Patent No.: US 10,354,634 B2
(45) Date of Patent: *Jul. 16, 2019

(54) METHOD AND SYSTEM FOR DENOISE AND DEREVERBERATION IN MULTIMEDIA SYSTEMS

(71) Applicant: ACCUSONUS, INC., Lexington, MA (US)

(72) Inventors: Alexandros Tsilfidis, Athens (GR); Elias Kokkinis, Patras (GR)

(73) Assignee: ACCUSONUS, INC., Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/790,345

(22) Filed: Oct. 23, 2017

(65) Prior Publication Data
US 2018/0047378 A1 Feb. 15, 2018

Related U.S. Application Data

(63) Continuation of application No. 15/231,451, filed on Aug. 8, 2016, now Pat. No. 9,799,318, which is a continuation of application No. 14/739,225, filed on Jun. 15, 2015, now Pat. No. 9,414,158, which is a continuation of application No. 13/798,799, filed on Mar. 13, 2013, now Pat. No. 9,060,052.

(51) Int. Cl.
*G10K 11/16* (2006.01)
*H04M 9/08* (2006.01)
*H04R 3/00* (2006.01)

(52) U.S. Cl.
CPC ............. *G10K 11/16* (2013.01); *H04M 9/082* (2013.01); *H04R 3/002* (2013.01)

(58) Field of Classification Search
CPC .............................. G10K 15/12; G10K 11/16
See application file for complete search history.

(56) References Cited

U.S. PATENT DOCUMENTS

| 6,711,536 B2 | 3/2004 | Rees |
| 8,903,722 B2 | 12/2014 | Jeub et al. |
| 9,060,052 B2 | 6/2015 | Tsilfidis et al. |
| 9,414,158 B2 | 8/2016 | Tsilfidis et al. |
| 9,799,318 B2 | 10/2017 | Tsilfidis et al. |
| 2012/0328112 A1 | 12/2012 | Jeub et al. |

OTHER PUBLICATIONS

Furuya, Ken'ichi et al., "Robust Speech Dereverberation Using Multichannel Blind Deconvolution with Spectral Subtraction," IEEE Trans. Audio, Speech and Lang. Process., vol. 15, No. 5, Jul. 2007, pp. 1579-1591.

(Continued)

*Primary Examiner* — Regina N Holder
(74) *Attorney, Agent, or Firm* — Sheridan Ross, PC

(57) ABSTRACT

Method and system for use with multimedia signals that analyzes the signals into time-frequency frames over first and second time periods. Estimates of the noise and/or reverberation are derived from the frames. Gains are derived from the estimates and raised to a power to create modified gains. The modified gains are applied to the frame in the appropriate time periods. Modified multimedia signals are output after being processed by the modified gains.

21 Claims, 10 Drawing Sheets

(56) References Cited

OTHER PUBLICATIONS

Lebart, K. et al., "A New Method Based on Spectral Subtraction for Speech Dereverberation," S. Hirzel Verlag, EAA, Acta Acust. Acustica, vol. 87, 2001, pp. 359-366.
Wu, Mingyan, et al., "A Two-Stage Algorithm for One-Microphone Reverberant Speech Enhancement," IEEE Trans. Audio, Speech and Lang. Process., vol. 14, No. 3, May 2006, pp. 774-784.
Jeub, Marco et al. "Model-Based Dereverberation Preserving Binaural Cues" IEEE Transactions on Audio, Speech, and Language Processing, vol. 18, No. 7, Sep. 2010.
Office Action for U.S. Appl. No. 13/798,799, dated Feb. 18, 2015.
Notice of Allowance for U.S. Appl. No. 13/798,799, dated Apr. 30, 2015.
Office Action for U.S. Appl. No. 14/739,225, dated Feb. 11, 2016.
Notice of Allowance for U.S. Appl. No. 14/739,225, dated May 27, 2016.
Office Action for U.S. Appl. No. 15/231,451 dated Sep. 13, 2016.
Office Action for U.S. Appl. No. 15/231,451 dated Feb. 2, 2017.
Notice of Allowance for U.S. Appl. No. 15/231,421 dated Aug. 29, 2017.

METHOD AND SYSTEM FOR DENOISE AND DEREVERBERATION IN MULTIMEDIA SYSTEMS

CROSS REFERENCE TO RELATED APPLICATIONS

This application is a Continuation of U.S. patent application Ser. No. 15/231,451, filed Aug. 8, 2016, now U.S. Pat. No. 9,799,318, which is a Continuation of U.S. patent application Ser. No. 14/739,225, filed Jun. 15, 2015, now U.S. Pat. No. 9,414,158, which is a Continuation of U.S. patent Ser. No. 13/798,799, filed Mar. 13, 2013, now U.S. Pat. No. 9,060,052, entitled "Single-Channel, Binaural and Multi-Channel Dereverberation, the entirety of which is incorporated herein by reference.

TECHNICAL FIELD

Various embodiments of the present application relate to a method and a processing system that enhances one or more microphone signals, by estimating and reducing reverberation. The present application relates to any electronic device such as hearing aid devices, ear phones, mobile phones, active ear protection systems, public address systems, teleconference systems, hands-free devices, automatic speech recognition systems, multimedia software and systems, systems for professional audio, dect phones, desktop or laptop computers, tablets, etc.

BACKGROUND

When a sound is emitted in a closed space, it is usually distorted from reverberation. This degradation is detrimental to sound quality and to speech intelligibility and it significantly degrades the performance of Automatic Speech Recognition (ASR) systems. Reverberation is also harmful for most speech-related applications, such as automatic speaker recognition, automatic emotion recognition, speech detection, speech separation, pitch tracking, speech segregation, etc. In addition, reverberation degrades the quality of music signals and decreases the performance of music-related tasks such as music signal classification, automatic music transcription, analysis and melody detection, source separation, etc. Therefore, there is a great need for dereverberation methods and systems.

In room acoustics, room reverberation can be considered as the combination of early reverberation (alternatively called early reflections) and late reverberation. The early reflections arrive right after the direct sound and they mainly result to a spectral degradation which is perceived as coloration. The early reflections are not considered harmful for speech intelligibility, ASR or any other signal-processing task, however they can typically alter the signal's timbre. Late reverberation arrives after the early reverberation and produces a noise-like effect, generated by the signal's reverberant tails. Late reverberation is detrimental for the signal's quality, the intelligibility of speech and it severely degrades the performance of signal processing algorithms. In addition, late reverberation is also responsible for a severe degradation of speech intelligibility in hearing impaired listeners, even when they use hearing assistive devices such as hearing aids or cochlear implants.

In signal processing, when assuming a Linear and Time Invariant system, deconvolution can be typically applied in order to suppress a convolutive distortion. Since reverberation is a convolutive distortion, deconvolution is the ideal way of confronting the reverberation problem. FIG. 1 shows a schematic illustration of the ideal dereverberation via deconvolution. The anechoic signal $x(n)$ 102 (n is the time index) is reproduced in a closed space and it is distorted from room reverberation 104. The reverberation distortion can be mathematically expressed as time-domain convolution of the anechoic signal with the Room Impulse Response (RIR) $h(n)$. Therefore, the reverberant signal $y(n)$ can be obtained as:

$$y(n)=x(n)*h(n) \tag{1}$$

where * denotes time-domain convolution. In theory, the RIR $h(n)$ can be blindly estimated from the reverberant signal or acoustically measured via an appropriate technique 106. This estimation or measurement of the RIR can be used to deconvolve the reverberant signal from the RIR $D(y(n))$ 108 and to obtain an estimation of the clean signal $\hat{x}(n)$ 110. When the RIR is exactly known, the estimation $\hat{x}(n)$ is equal to the anechoic signal $x(n)$. So in theory, an ideal inversion (deconvolution) of the Room Impulse Response (RIR) will completely remove the effect of both early reflections and late reverberation. However, there are several problems with this ideal approach. First of all, typical RIRs have thousands of coefficients and an exact blind estimation is practically impossible. Moreover, the RIR is known to have non-minimum phase characteristics, the inverse filters are to a large extent non-causal and exact measurements of the RIR must be available for the specific source/receiver room positions. When the sound source is moving, the RIR constantly changes and accurate measurements are impossible. Hence, for real-life applications RIR measurements are not available and other blind dereverberation options that do not try to accurately estimate the RIR or use any prior information of the acoustic channel are needed.

Blind dereverberation (i.e. dereverberation without any other prior knowledge other than the reverberant signal) is a difficult task and it produces signal processing artifacts. Hence, the produced output signal is often of insufficient quality. Despite engineering efforts, the dereverberated signals often fail to improve signal quality and speech intelligibility. In many cases, blind dereverberation methods produce artifacts that are more harmful than the original reverberation distortion. Accordingly, a need exists to overcome the above mentioned drawbacks and to provide a method and a system for significant dereverberation of digital signals without producing processing artifacts.

Typical dereverberation methods confront either the early or the late reverberation problem. In order to tackle reverberation as a whole, early and late reverberation suppression methods have been used sequentially. An early reverberation suppression method is typically used as a first step to reduce the early reflections. Usually, in a second step a late reverberation suppression approach suppresses the signal's reverberant, tail. However, early and late reverberation suppression methods have not been used in parallel. The goal of processing early and late reverberation in parallel, or combining multiple late/early reverberation estimation methods is to provide new artifact-free clean signal estimations.

In addition, the required amount of dereverberation strongly depends on the room acoustic characteristics and the source-receiver position or positions. Dereverberation algorithms should inherently include an estimation of relevant room acoustic characteristics and also estimate the correct suppression rate (e.g the amount and steepness of dereverberation), given that for a moving source or receiver the acoustic environment constantly changes. When the reverberation suppression rate is incorrect, it causes processing artifacts. Therefore, taking into consideration the acoustic environment (e.g. room characteristics such as dimensions and materials, acoustic interferences, source location, receiver location, etc.) there is a need for a method of controlling the reverberation suppression rate, either by a user or automatically.

SUMMARY

Aspects of the invention relate to processing early and late reverberation in parallel and/or or combining multiple late/early reverberation estimation methods.

Aspects of the invention also relate to estimation of relevant room acoustic characteristics and also estimate the correct suppression rate (e.g the amount and steepness of dereverberation).

Aspects of the invention also relate to taking into consideration the acoustic environment (e.g. room characteristics such as dimensions and materials, acoustic interferences, source location, receiver location, etc.)

Aspects of the invention also relate to controlling the reverberation suppression rate, either by a user or automatically.

Additional exemplary, non-limiting aspects of the invention include;

1. A method for processing a first digital signal comprising:
   obtaining a time-frequency representation of said first signal;
   estimating spectral energy of said first signal;
   generating a second signal which relates to said first signal and said spectral energy;

2. A system for processing a first digital signal the system capable of:
   obtaining a time-frequency representation of said first signal;
   estimating spectral energy of said first signal;
   generating a second signal which relates to said first signal and said spectral energy;
   transforming said second signal back to time domain.

3. A non-transitory computer-readable information storage media having stored thereon instructions, that if executed by a processor, cause to be performed a method comprising:
   obtaining a time-frequency representation of said first signal;
   estimating spectral energy of said first signal;
   generating a second signal which relates to said first signal and said spectral energy;
   transforming said second signal back to time domain.

4. The method of aspect 1, system of aspect 2 or media of aspect 3 wherein said second signal is generated as:

$$\hat{X}_i(\omega, \mu) = \frac{E_i(\mu) Y_i(\omega, \mu)}{f_\Omega}$$

5. The method of aspect 1, system of aspect 2 or media of aspect 3 wherein said second signal is generated as:

$$\hat{X}_i(\omega, \mu) = \frac{(Y_i(\omega, \mu))^\lambda}{f}$$

6. The method of aspect 1, system of aspect 2 or media of aspect 3 where said first digital signal is one or more of an audio signal, single channel, binaural and multichannel.

7. A method for suppressing reverberation from digital signals comprising:
   obtaining a first estimation of late reverberation;
   changing said first estimation of late reverberation according to a second reverberation estimation and obtaining a changed estimation;
   suppressing reverberation using said changed estimation.

8. A system for suppressing reverberation from digital signals, the system capable of:
   obtaining a first estimation of late reverberation;
   changing said first estimation of late reverberation according to a second reverberation estimation and obtaining a changed estimation;
   suppressing reverberation using said changed estimation.

9. A non-transitory computer-readable information storage media having stored thereon instructions, that if executed by a processor, cause to be performed a method comprising:
   obtaining a first estimation of late reverberation;
   changing said first estimation of late reverberation according to a second reverberation estimation and obtaining a changed estimation;
   suppressing reverberation using said changed estimation.

10. The method of aspect 7, system of aspect 8 or media of aspect 9 where said digital signals are one or more of audio signals, single channel, binaural and multichannel.

11. The method of aspect 7, system of aspect 8 or media of aspect 9 wherein said second reverberation estimation is related to one or more of late reverberation and early reverberation.

12. The method of aspect 7, system of aspect 8 or media of aspect 9 wherein said first estimation of late reverberation is obtained using a combination of said digital signals.

13. The method of aspect 7, system of aspect 8 or media of aspect 9 wherein said first estimation of late reverberation is used to obtain a first dereverberation gain filter.

14. The method of aspect 7, system of aspect 8 or media of aspect 9 wherein said second reverberation estimation is related to coherence.

15. A method for suppressing reverberation from digital signals comprising:
   obtaining a first estimation of reverberation;
   changing said first estimation of reverberation according to a coherence estimation;
   suppressing reverberation using said changed estimation.

16. A system for suppressing reverberation from digital signals the system capable of:
   obtaining a first estimation of reverberation;
   changing said first estimation of reverberation according to a coherence estimation;
   suppressing reverberation using said changed estimation 17. A non-transitory computer-readable information storage media having stored thereon instructions, that if executed by a processor, cause to be performed a method comprising:
   obtaining a first estimation of reverberation;
   changing said first estimation of reverberation according to a coherence estimation;
   suppressing reverberation using said changed estimation 18. The method of aspect 15, system of aspect 16 or media of aspect 17 wherein said changed estimation is obtained by modifying the suppression by a function $$G_{coh}(\omega,\mu) = (\tilde{G}(\omega,\mu)^{1-\Phi(\omega,\mu)^\gamma})^2$$

19. A method for controlling the amount of processing of digital signals comprising:
    obtaining a first processing gain;
    modifying said first processing gain in relation to the values of said processing gain.

20. A system for controlling the amount of processing of digital signals, the system capable of:
    obtaining a first processing gain;
    modifying said first processing gain in relation to the values of said processing gain.

21. A non-transitory computer-readable information storage media having stored thereon instructions, that if executed by a processor, cause to be performed a method comprising:
    obtaining a first processing gain;
    modifying said first processing gain in relation to the values of said processing gain.

22. The method of aspect 19, system of aspect 20 or media of aspect 21 wherein said processing gain values with lower values are increased more drastically than those with higher gain values.

23. The method of aspect 19, system of aspect 20 or media of aspect 21 wherein said processing gain values with higher values are decreased more drastically than those with lower gain values.

24. The method of aspect 19, system of aspect 20 or media of aspect 21 wherein said processing gain is modified by a function of $G_{new}(\omega,\mu)=(G(\omega,\mu))^{\nu}$.

BRIEF DESCRIPTION OF THE DRAWINGS

For a more complete understanding of the invention, reference is made to the following description and accompanying drawings, in which.

DETAILED DESCRIPTION

Hereinafter, embodiments of the present invention will be described in detail in accordance with the references to the accompanying drawings. It is understood that other embodiments may be utilized and structural changes may be made without departing from the scope of the present application.

The exemplary systems and methods of this invention will also be described in relation to reducing reverberation in audio systems. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein. The terms determine, calculate and compute, and variations thereof, as used herein are used interchangeably and include any type of methodology, process, mathematical operation or technique.

Figure 1:
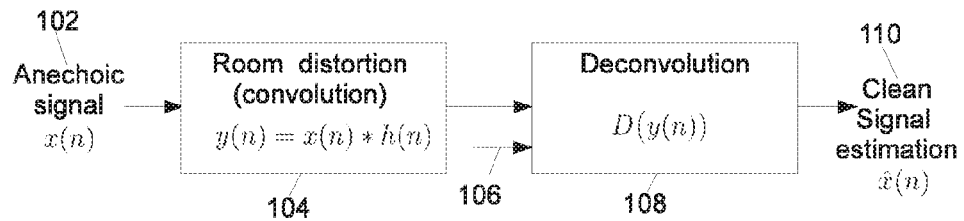
FIG. 1 illustrates an exemplary schematic representation of the reverberation suppression through deconvolution.
Figure 2:
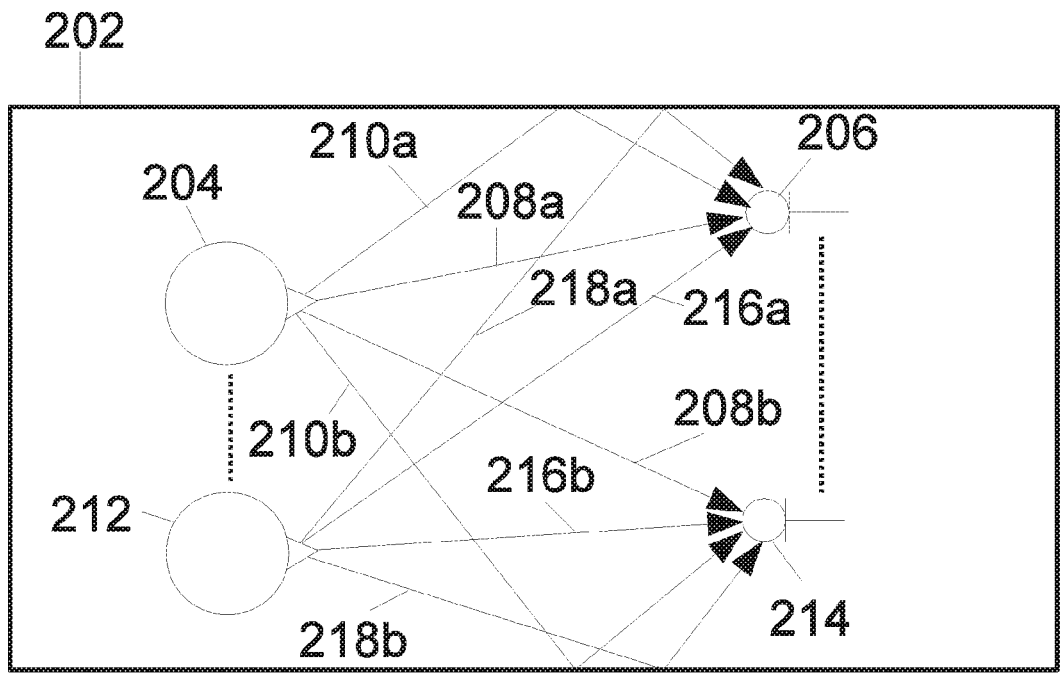
FIG. 2 illustrates an exemplary schematic representation illustrating the reverberation environment.

FIG. 2 schematically illustrates an exemplary case, where in a closed space 202 there are L sound sources (speakers) and M receivers (microphones). Each microphone captures the direct and the reverberant sound of all speakers. In FIG. 2 it is schematically shown that the first microphone 206 captures simultaneously the direct and the reverberant sounds of all speakers, starting from the direct 208a and the reverberant, 210a sound of the first speaker 204 up to the direct 216a and the reverberant 218a sound of the Lth speaker 212. In addition, it is illustrated that the Mth microphone 214 captures simultaneously the direct 208b and the reverberant 210b sound of the first speaker 204 and ending to the direct 216b and the reverberant 218b sound of the Lth speaker 212. For illustrating reasons, in FIG. 2 reverberation of each sound source is represented as a single arrow; however reverberation can be the sum of a number of individual reflections. In the setup of FIG. 2 L speakers are shown as sound sources. In other examples, said sound sources can be musical instruments, loudspeakers or any other device/object/living being that produces or delivers a sound signal. The setup illustrated in FIG. 2 and all embodiments of the present application are valid for any number of sources and receivers.

Figure 3:
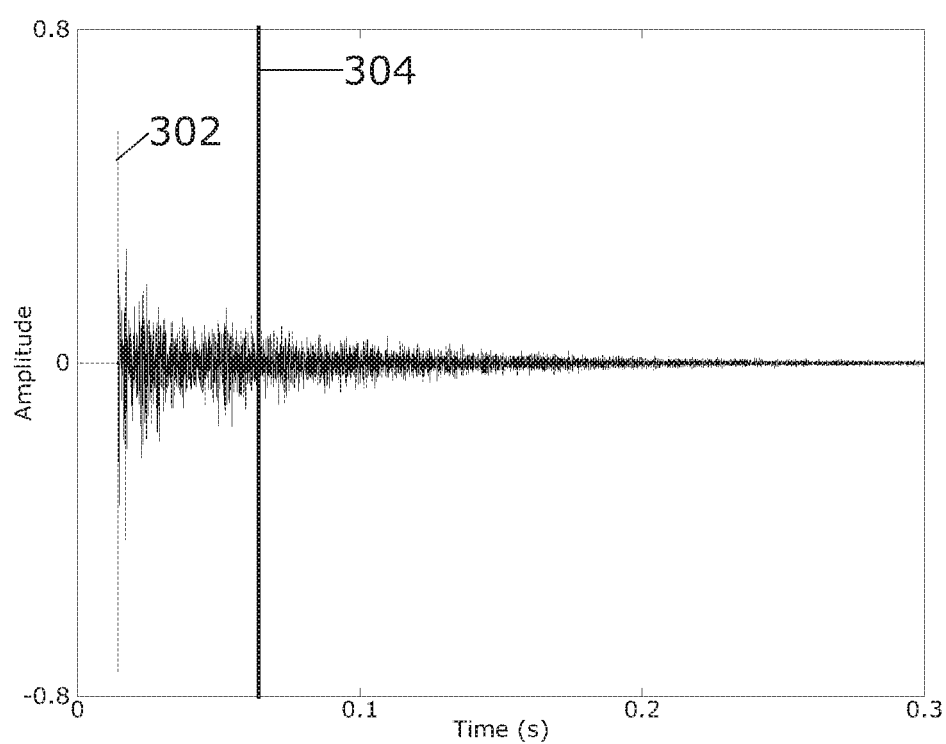
FIG. 3 illustrates an exemplary room impulse response.

Following one exemplary model, the RIR captures the acoustic characteristics of a closed space. An exemplary RIR is shown as an example in FIG. 3. The direct sound 302 precedes the early reflections. The early reverberation spans up to the boundary 304, which can be broadly placed, for example around 50-80 ms. After this boundary 304, late reverberation arises and fades out to a degree defined by the room's acoustic properties. Given the foregoing, a RIR h(n) can be decomposed in a direct part $h_{dir}(n)$, an early reflections part $h_{ear}(n)$ and a late reverberation part $h_{lat}(n)$ $$h(n)=h_{dir}(n)+h_{ear}(n)+h_{lat}(n) \tag{2}$$

where n is the discrete time index. The direct part of the RIR $h_{dir}(n)$ can be modeled as Kronecker delta function, shifted $n_s$ samples and attenuated by a factor κ

$$h_{dir}(n)=\kappa\delta(n-n_s) \tag{3}$$

where $\kappa$ and $n_s$ mainly depend on the source-receiver distance and the physical characteristics of the propagation medium.

For illustrative reasons, one exemplary model for reverberation is described below. According to FIG. 2 the sound captured by the ith receiver can be described as $$y_i(n) = \sum_{j=1}^{L} x_j(n) * h_{ij}(n) \qquad (4)$$

where $x_j(n)$ represents the jth discrete-time anechoic source signal, $h_{ij}(n)$ is the impulse response that models the acoustic path between the jth source and the ith receiver and the * sign denotes time-domain convolution. According to the equations 2, 3, 4 a captured reverberant signal accounts for three components: (i) an anechoic part, (ii) early reverberation part and (iii) late reverberation part $$y_i(n) = \sum_{j=1}^{L} x_j(n) * \delta(n - n_{s_{ij}}) + \sum_{j=1}^{L} x_j(n) * h_{ear_{ij}}(n) + \sum_{j=1}^{L} x_j(n) * h_{lat_{ij}}(n) \qquad (5)$$

Considering now a direct part consisting of the anechoic part and the early reflections part $\hat{x}_i(n)$ and a late reverberation part $\hat{r}_i(n)$, equation 5 becomes $$y_i(n) = \hat{x}_i(n) + \hat{r}_i(n) \qquad (6)$$
where $$\hat{x}_i(n) = \sum_{j=1}^{L} x_j(n) * \delta(n - n_{s_{ij}}) + \sum_{j=1}^{L} x_j(n) * h_{ear_{ij}}(n) \qquad (7)$$

and $$\hat{r}_i(n) = \sum_{j=1}^{L} x_j(n) * h_{lat_{ij}}(n) \qquad (8)$$

Although the effect of reverberation can be observed in the time domain signal, the effect of the acoustic environment and in particular the room dimensions and materials are best observed in the frequency domain. Dereverberation can be theoretically achieved either in the time or in the frequency domain. As a consequence, it is beneficial to utilize dereverberation estimation and reduction techniques in the time-frequency domain, using a relevant transform. The time-domain reverberant signal of equation 5 can be transformed in the time-frequency domain using any relevant technique. For example, this can be done via a short-time Fourier transform (STFT), a wavelet transform, a polyphase filterbank, a multi rate filterbank, a quadrature mirror filterbank, a warped filterbank, an auditory-inspired filterbank, etc. Each one of the above transforms will result to a specific time-frequency resolution, that will change the processing accordingly. All embodiments of the present application can use any available time-frequency transform.

The reverberant signal $y_i(n)$ can be transformed to the $Y_i(\omega,\mu)$ where $\omega$ is a frequency index and $\mu$ is a time index. In exemplary embodiments, $\omega$ denotes the index of the frequency bin or the sub-band and $\mu$ denotes the index of a time frame or a time sample. In some embodiments, the Short Time Fourier Transform technique can be used, together with an appropriate overlap analysis-synthesis technique such as the overlap add or overlap save. Analysis windows can be set, for example, at 32, 64, 128, 256, 512, 1024, 2048, 4096 and 8192 samples for a sampling frequencies of 4000, 8000, 12000, 16000, 44100, 48000 and 96000, 192000 Hz. According to equation 4 the captured reverberant signal in the time-frequency domain can be represented as $$Y_i(\omega, \mu) = \sum_{j=1}^{L} X_j(\omega, \mu) H_{ij}(\omega, \mu) \qquad (9)$$

where $X_j(\omega,\mu)$ and $H_{ij}(\omega,\mu)$ are the time-frequency representations of $x_j(n)$ and $h_{ij}(n)$ respectively.

Generally speaking, reverberation is a convolutive distortion; however since late reverberation arrives in the diffuse field, it is not highly correlated with the original sound source. Given the foregoing, it can be sometimes considered as an additive degradation with noise-like characteristics. Considering late reverberation as an additive distortion and by transforming equation 6 in the time-frequency domain the reverberant signals can be modeled as $$Y_i(\omega,\mu) = \hat{X}_i(\omega,\mu) + \hat{R}_i(\omega,\mu) \qquad (10)$$

where $\hat{X}_i(\omega,\mu)$ represents the direct sound received in the ith microphone (containing the anechoic signal and the early reverberation) and $\hat{R}_i(\omega,\mu)$ is the late reverberation received in the ith microphone. Following this model we can estimate the direct part of the sound signals. Many techniques can be used for this such as spectral subtraction, Wiener filtering, Kalman filtering, a Minimum Mean Square Estimators (MMSE), Least Means Square (LMS) filtering, etc. All relevant techniques are in the scope of the present application. As an example application and without departing from the scope of the present invention spectral subtraction (i.e. a subtraction in the time-frequency domain) will be mostly used thereafter:

$$\hat{X}_i(\omega,\mu) = Y_i(\omega,\mu) - \hat{R}_i(\omega,\mu) \qquad (11)$$

The estimation of the clean signals can be derived by applying appropriate gains $G_i(\omega,\mu)$ on the reverberant signals i.e.:

$$\hat{X}_i(\omega,\mu) = G_i(\omega,\mu) Y_i(\omega,\mu) \qquad (12)$$

where $$G_i(\omega, \mu) = \frac{\hat{X}_i(\omega, \mu)}{Y_i(\omega, \mu)} \qquad (13)$$

and in an exemplary embodiment where spectral subtraction is used $$G_i(\omega, \mu) = \frac{Y_i(\omega, \mu) - \hat{R}_i(\omega, \mu)}{Y_i(\omega, \mu)} \qquad (14)$$

The term gain in such techniques is not just a typical amplification gain (although the signal may be amplified in some cases). The dereverberation gain functions mentioned in embodiments of the present invention can be viewed as scale factors that modify the signal in the time-frequency domain. Given that $\hat{X}_i(\omega,\mu)$ and $\hat{R}_i(\omega,\mu)$ can be assumed uncorrected (due to the nature of late reverberation), equation 10 can be written as $$|Y_i(\omega,\mu)|^\psi = |\hat{X}_i(\omega,\mu)|^\psi + |\hat{R}_i(\omega,\mu)|^\psi \quad (15)$$

For certain embodiments $\psi=1$, 2 and the described model is implemented in the magnitude or power spectrum domain respectively. All embodiments of the present invention are relevant for any $\psi$ value. In order to keep the notations simple, the magnitude spectrum is discussed in detail but any $\psi$ value can be used.

Equation 12 presents an example for producing a signal where late reverberation has been removed. The gain function G is calculated based on the received (reverberant) signal and knowledge of the nature of late reverberation in the acoustic environment. G can be measured or known a priori, or stored from previous measurements. G is a function of frequency ($\omega$) and time ($\mu$) but can also be a scalar or a function of just $\omega$ or $\mu$.

The gain functions $G_i(\omega,\mu)$ of equations 12, 13, 14 can be bounded in the closed interval [0,1]. When $G_i(\omega,\mu)=0$ we consider that the signal component consists entirely of late reverberation and we totally suppress the original signal. When $G_i(\omega,\mu)=1$ we consider that the reverberant signal does not contain any late reverberation and the reverberant signal remains intact. Spectral subtraction is not the only way to derive gain functions $G_i(\omega,\mu)$. As mentioned before, in other exemplary embodiments the gain functions $G_i(\omega,\mu)$ can be extracted according to equation 13 by any technique that provides a first estimation of a clean signal $\hat{X}_i(\omega,\mu)$, such as Wiener filtering, subspace, statistically based, perceptually-motivated, etc.

Ideally, both early and late reverberation must be suppressed from the reverberant signal. However, it is known that: (i) late reverberation is considered more harmful than the early reflections, (ii) blind dereverberation methods, where no knowledge other than the reverberant signal is used, usually result to severe processing artifacts and (iii) the aforementioned processing artifacts are more likely to appear when we are trying to completely remove all signal distortions rather than just reducing the more harmful ones. Hence, in exemplary embodiments we might be interested in removing only late reverberation.

Figure 4:
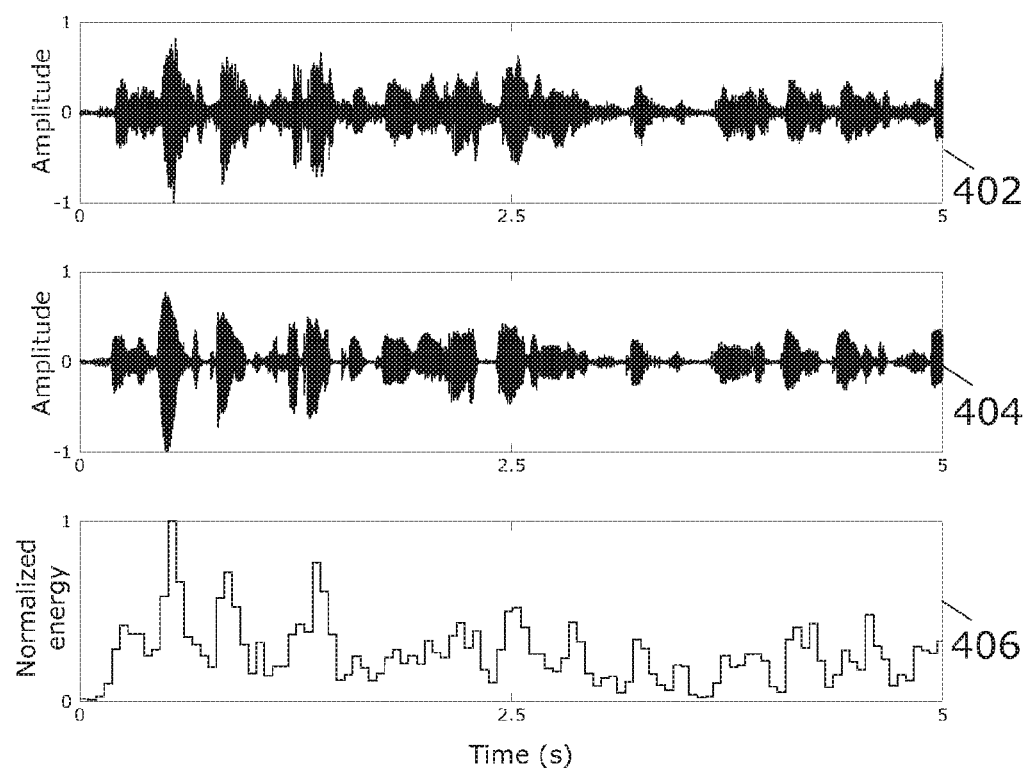
FIG. 4 illustrates an exemplary reverberant signal, an anechoic signal and the normalized spectral energy of successive reverberant signal frames.

A metric for measuring the reverberation degradation is the Signal to Reverberation Ratio (SRR), which is the equivalent to the Signal to Noise Ratio (SNR) when reverberation is considered a form of additive noise. High SRR regions are not severely contaminated from reverberation and they are usually located in signal components where the energy of the anechoic signal is high. Therefore, in such signal parts, the anechoic sound source is dominant and they are mainly contaminated by early reverberation, typically as a form of spectral coloration. On the other hand, low SRR signal parts are significantly distorted from reverberation. Such signal components are likely to be found in places where the anechoic signal was quiet, (i.e. low-energy anechoic signal components). These regions are usually located at the signal's reverberant tails. FIG. 4 illustrates an exemplary reverberant signal 402 and an anechoic signal 404. Looking at these time domain representations, the smearing effect of reverberation becomes apparent, since late reverberation has filled silence gaps that are present in the anechoic signal 404. It can also be noticed that the energy envelope of the reverberant signal broadly follows the time-envelope of the anechoic signal. This assumption is generally true, unless we are into extreme acoustic conditions. Such conditions can be encountered inside very big spaces (e.g sport halls, etc.) for long source-receiver distances (for example longer than 80-100 feet). For illustrative reasons, in FIG. 4 the normalized mean spectral energy of successive reverberant frames is also shown 406. By comparing the reverberant signal 402 and the anechoic signal 404 of FIG. 4, the high and low SRR regions can be identified. Given the foregoing and by examining 406, it can be seen that high SRR regions, are identified in higher energy frames of the reverberant signal while low SRR regions usually correspond to low energy frames and they are mainly located at the signal's reverberant tails. Hence, the mean spectral energy of each reverberant frame can be associated with the reverberation intrusion. In certain embodiments of the present application the above findings are used for dereverberation. In said embodiments a dereverberated signal is generated, as a function of the reverberant signal and the spectral energy of all or part of the reverberant signal.

In an exemplary embodiment, the energy of the reverberant signal's magnitude spectrum can be calculated in each frame as $$E_i(\mu) = \sum_{\omega=1}^{\Omega} Y_i(\omega, \mu) \quad (16)$$

where $\Omega$ is the number of frequency bins. Since this energy was found to be directly related to the amount of reverberation degradation, it can be used in exemplary embodiments in order to provide a dereverberation gain and used to remove reverberation, as explained for example in equation 12. In order to bound the $E_i(\mu)$ values between [0,1], the energy values are normalized using an appropriate normalization factor $f_\Omega$. Hence, the direct sound can be estimated as $$\hat{X}_i(\omega, \mu) = \frac{E_i(\mu) Y_i(\omega, \mu)}{f_\Omega} \quad (17)$$

where $E_i(\mu)/f_\Omega$ represents the gain $G_i$ as a function of time at the $i^{th}$ receiver. The factor $f_\Omega$ is typically related to the size of the reverberant frame. In one example, the factor $f_\Omega$ can be computed as the energy of a white noise frame of length $\Omega$ and of the maximum possible amplitude allowed by the reproduction system. In another example, $f_\Omega$ can be obtained as the maximum spectral frame energy selected from a large number of speech samples, reproduced at the maximum amplitude allowed by the system. In other exemplary embodiments, instead of calculating the mean energy over each frame, the mean energy over specific sub-bands can be calculated. In examples, these sub-bands can be defined from the mel scale or the bark scale, they can rely on properties of the auditory system or they can be signal-dependent.

Figure 5:
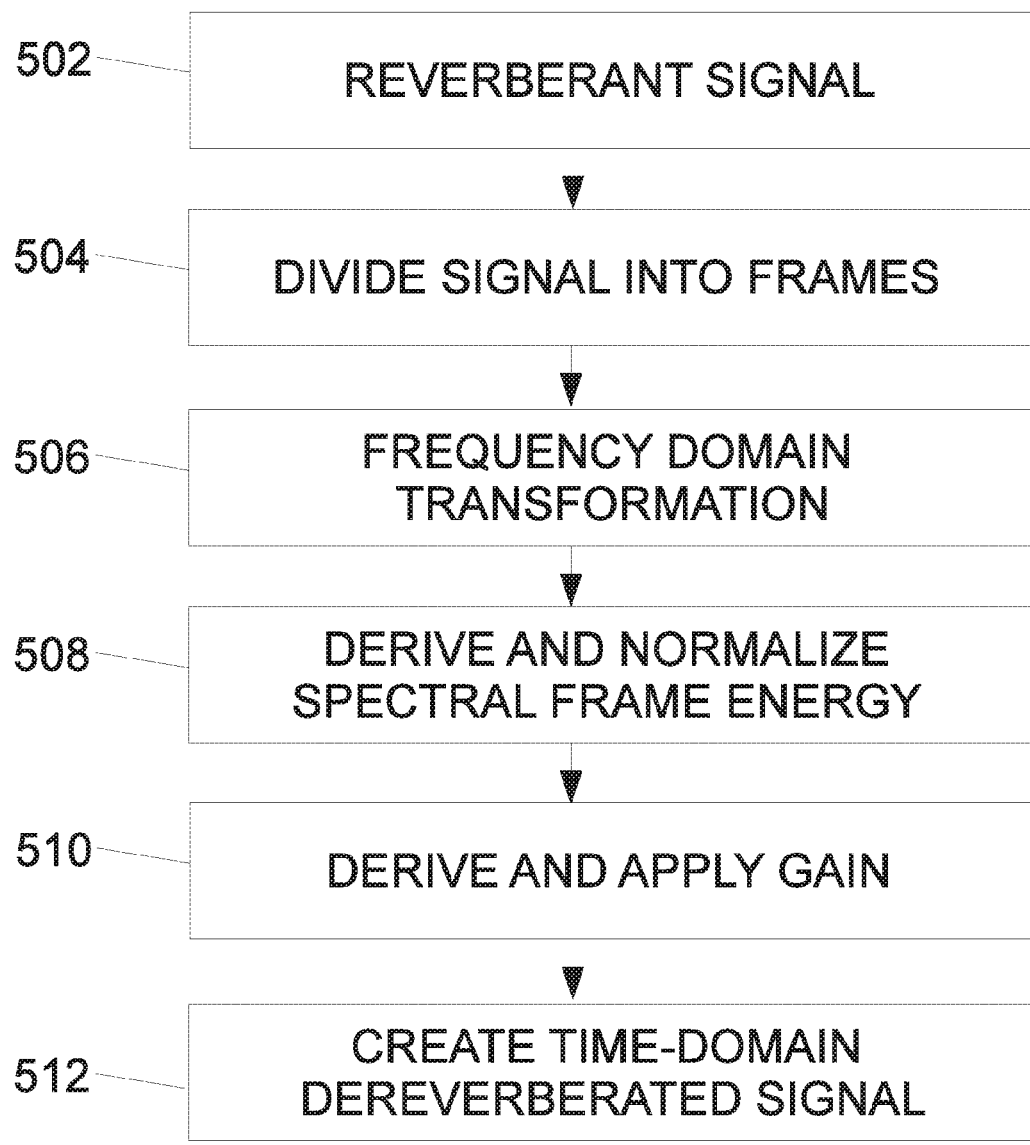
FIG. 5 is a block diagram illustrating an exemplary method that suppresses late reverberation from a digital reverberant signal in relation to the frame spectral energy in accordance with embodiments of the present application.

FIG. 5 illustrates one example for a method for late reverberation suppression from an acoustic signal. In a first step the reverberant signal 502 is divided into time frames 504. The frames are appropriately overlapped and windowed, and a transform in the spectral domain is performed 506 in order to derive the time-frequency representations of the reverberant signal. The spectral energy of each time frame is computed and normalized 508. Then a spectral gain is derived and applied to the reverberant frame spectrum 510, according to for example equation 12. The inverse transform is applied and we obtain a dereverberated signal in the time domain 512. The inverse transform process may include an overlap add or other reconstruction technique. As discussed earlier, in order to process the signal to the time-frequency domain, any appropriate filterbank can be alternatively used. During the conversion back to the time domain, the inverse filterbank transform is utilized. The above dereverberation method is appropriate for real time signal processing and has low computational cost.

In another embodiment of the present application, we can assume that low energy frequency bins are more likely to contain significant amounts of reverberation and high energy frequency bins are more likely to contain direct signal components. This can be also verified from FIG. 4, where we observe that low energy signal samples 406 usually correspond to low SRR values. Given the foregoing, the direct sound can be estimated as $$\hat{X}_i(\omega, \mu) = \frac{(Y_i(\omega, \mu))^\lambda}{f} \quad (18)$$

where $\lambda > 1$ is a factor controlling the suppression rate and f is a normalization factor. This approach disproportionately increases the energy of high energy frequency bins when compared to the energy of low frequency bins. The normalization factor f is directly linked to the maximum amplitude that the system can reproduce without distortion. The factor f can be measured or known and may also change with time.

Figure 6:
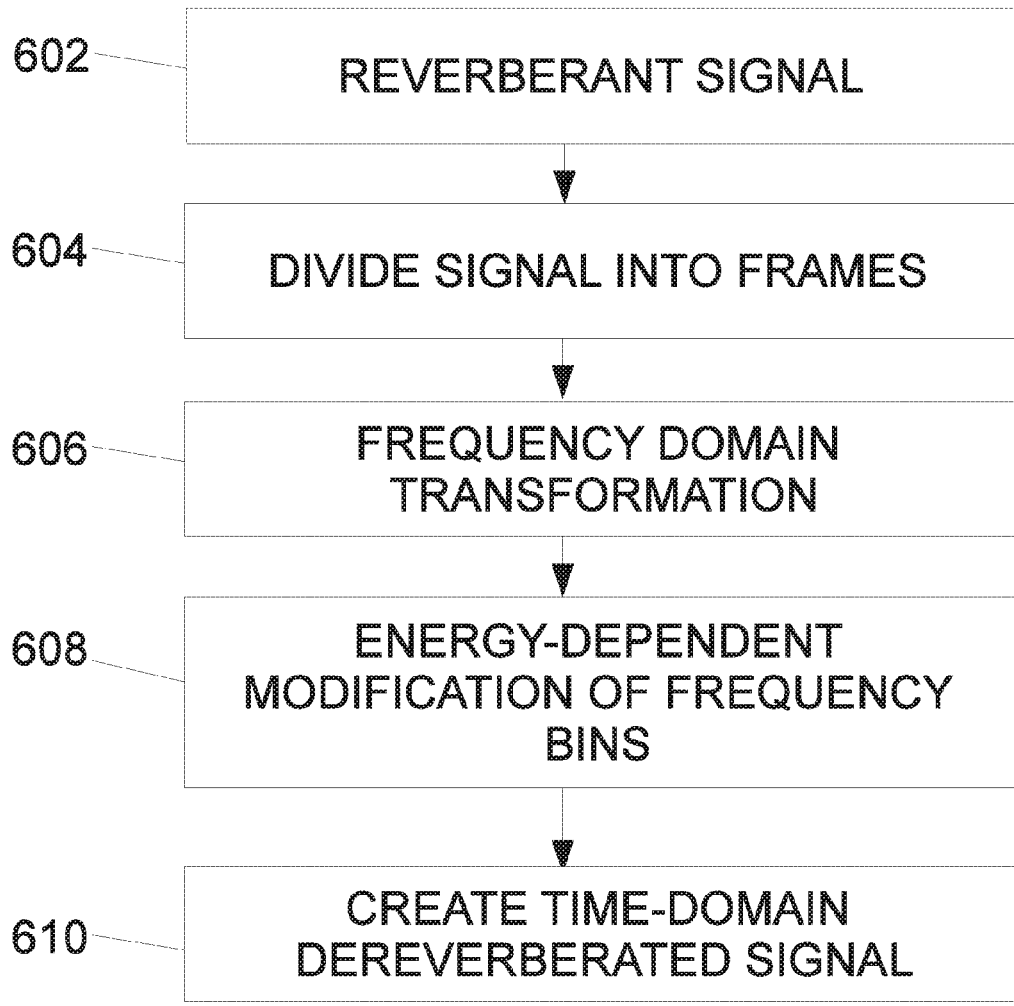
FIG. 6 is a block diagram illustrating an exemplary method that suppresses late reverberation from a digital reverberant signal in relation to the energy of the individual frequency bins in accordance with embodiments of the present application.

FIG. 6 illustrates another example of a method for late reverberation suppression from an acoustic signal, where the individual frequency bins are modified differently according to the exponent $\lambda$ of equation 17. In a first step the reverberant signal 602 is divided into frames 604 and an appropriate spectral transformation is applied 606 to derive the time-frequency representations of the reverberant signal. Measurements of the energy in one or more sets of frequency bins are performed. Then an energy-dependent modification of individual frequency bins is applied 608 by utilizing the energy measurements. The time domain signal is obtained by performing an inverse transformation and also usually using an overlap-add implementation 610. As discussed earlier, in order to process the signal to the time-frequency domain, any appropriate filterbank can be alternatively used. The above example is appropriate for real time signal processing and has low computational cost.

Blind methods for the suppression of late reverberation typically produce processing artifacts, mainly due to late reverberation estimation errors. Embodiments of the present invention minimize or totally avoid such detrimental processing artifacts. In exemplary embodiments this is achieved by combining different reverberation estimation methods, in order to improve the quality of the dereverberated signal. An output signal resulting from a dereverberation method that compensates for early reverberation, ideally contains: (i) an anechoic signal and (ii) late reverberation. An output signal resulting from a dereverberation method that compensates for late reverberation, ideally contains: (i) an anechoic signal and (ii) early reverberation.

Figure 7:
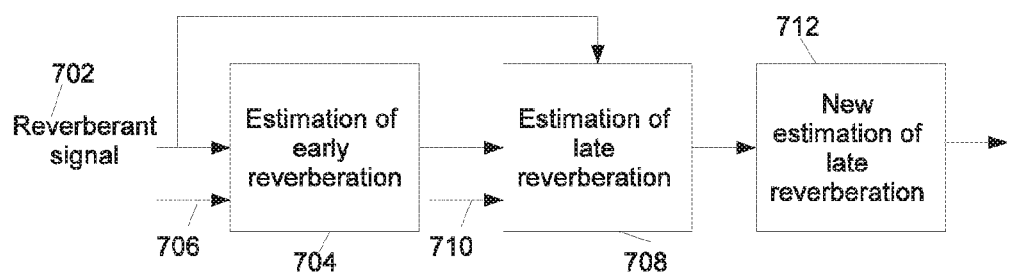
FIG. 7 illustrates a control-flow diagram of an exemplary method for estimating and reducing reverberation in signals in accordance with embodiments of the present application.

Given the foregoing, FIG. 7 illustrates a method for dereverberation, achieving suppression of late reverberation with minimal or no processing artifacts. According to FIG. 7, a reverberant signal 702 is used in order to obtain a first estimation of late reverberation 708 and a first estimation of early reverberation 704. In some embodiments, for the first estimation of early reverberation 704 or for the first estimation of late reverberation 708, other information (such as an impulse response measurement or other information related to the acoustic environment) can be used (706 and 710). However, the use of prior information or measurements is not a necessary step. Then the first estimation of early reverberation 704 together with the first estimation of late reverberation 708, are used in order to extract a new estimation of the late reverberation 712. This estimation contains minimal or no processing artifacts and it is then used in order to suppress late reverberation from the reverberant signal. Using estimates of early and late reverberation in parallel provides a new method with minimal or no processing artifacts.

Figure 8:
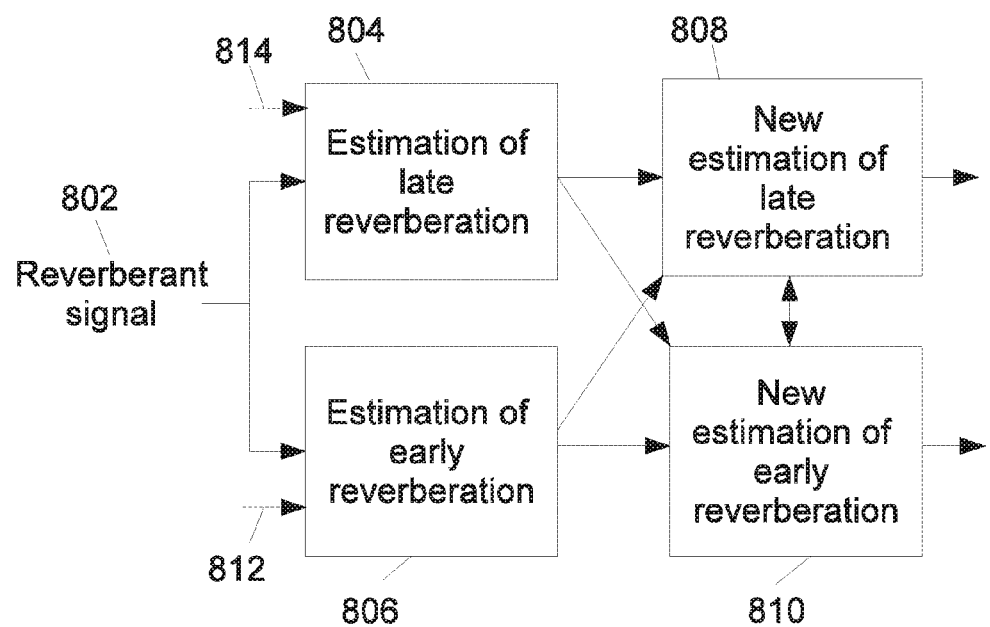
FIG. 8 illustrates a control-flow diagram of an exemplary method for estimating and reducing reverberation in signals in accordance with embodiments of the present application.

FIG. 8 illustrates an exemplary embodiment, where a reverberant signal 802 is used to obtain a first estimation of late reverberation 804 and a first estimation of early reverberation 806. In some embodiments, for these initial estimations of early 812 or late reverberation 814, other information (such as an impulse response measurement or other information related to the acoustic environment) might be used. Then a first estimation of early reverberation 806 along with a first estimation of late reverberation 804 are used to extract a new estimation of late reverberation 808. In addition, a first estimation of late reverberation 804 may be used along with a first estimation of the early reverberation 806 in order to derive a new estimation of early reverberation 810. In other embodiments, the new estimations of late 808 and early 810 reverberation can be also used to further eliminate the processing artifacts.

In another embodiment, two or more late reverberation estimation methods can be combined to provide a new method for late reverberation suppression, with minimal or no processing artifacts. All embodiments of the present application relating to methods of dereverberation can be either single-channel, binaural or multi-channel.

Figure 9:
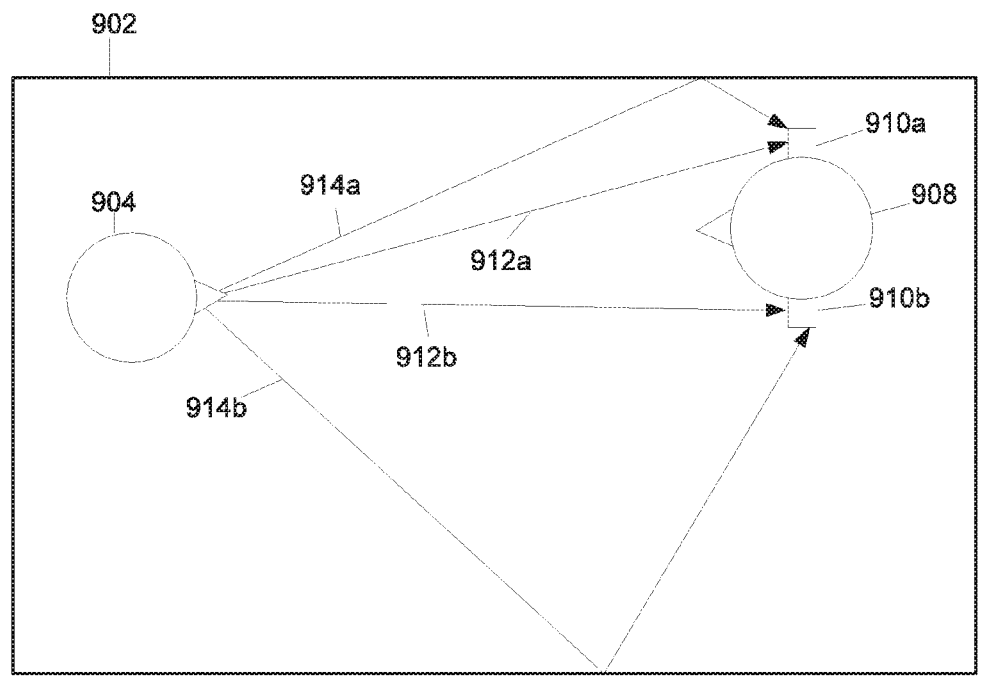
FIG. 9 illustrates an exemplary schematic representation illustrating a binaural reverberation environment.

An exemplary case of the general reverberation concept (previously illustrated in FIG. 2) is shown in FIG. 9. In this case at least one microphone is placed near each one of the listener's ears. If more than one microphone per ear channel are available, the microphone inputs of each channel can be combined. As an illustrative example, FIG. 9 illustrates a closed space 902, a speaker 904 and a listener 908 with two sound receivers (910a and 910b). In other embodiments these receivers can be components of hearing aid devices or cochlear implants. For this example, the receivers of the right ear capture the direct sound from the speaker 912a and the relating reverberation 914a, while the receiver of the left side capture the direct speaker sound 912b and the reverberation originated from the speaker's voice 914b. In many cases, the sound is captured binaurally and the devices of the left and right ear communicate with each other, preserving the sound localization cues perceived by the listeners. In other embodiments the listener may wear just one hearing aid or cochlear implant (falling into a single-receiver case) or he can wear a cochlear implant in one ear and a hearing aid in the other, etc.

In binaural setups such as the one described in FIG. 9, apart from the challenging task of reducing reverberation without introducing audible artifacts, binaural dereverberation methods should also at least preserve the Interaural Time Difference (ITD) and Interaural Level Difference (ILD) cues. The aforementioned binaural cues are important for hearing aid users, since they allow them to localize sounds in a three dimensional space. However, separate processing in each channel, i.e. bilateral processing, destroys the binaural localization cues. One way to preserve these cues is to apply identical processing to the left and right channels. This identical processing could also be of interested for simple 2-channel setups, where applying the same processing will reduce the computational cost.

For illustrative reasons one binaural model for reverberation will be described. Assuming a speaker and a listener having one receiver in his left ear and one receiver in his right ear. According to equation 10 the time-frequency domain discrete-time signal $Y_L(\omega,\mu)$ received in the listener's left ear is described as $$Y_L(\omega,\mu)=X_L(\omega,\mu)+R_L(\omega,\mu) \tag{19}$$

and the captured signal in his right ear receiver can be expressed in the time-frequency domain $Y_R(\omega,\mu)$ is described as $$Y_R(\omega,\mu)=X_R(\omega,\mu)+R_R(\omega,\mu) \tag{20}$$

where $X_L(\omega,\mu)$ and $X_R(\omega,\mu)$ are the direct signals (including the anechoic and the early reverberation parts) for the left and right channels respectively and $R_L(\omega,\mu)$ and $R_R(\omega,\mu)$ are the late reverberation components for the left and right channels respectively. Since we want to apply identical processing, we can derive a hybrid signal containing information from both the left and right ear channels. Therefore, we derive a new signal $\tilde{Y}(\omega,\mu)$ representing the sum of the left and right captured signals $$\tilde{Y}(\omega,\mu)=Y_R(\omega,\mu)+Y_L(\omega,\mu) \tag{21}$$

Now using $\tilde{Y}(\omega,\mu)$, we can broadly estimate late reverberation for both channels $\tilde{R}(\omega,\mu)$. In other embodiments, any combination of the left and right channel and can be used in order to derive $\tilde{Y}(\omega,\mu)$. Alternatively the new signal $\tilde{Y}(\omega,\mu)$ can be derived in the time domain and then transformed to the time frequency domain. Any known method for estimating late reverberation $\tilde{R}(\omega,\mu)$ can be used. However, some examples are presented in the embodiments described below.

In one embodiment, late reverberation $\tilde{R}(\omega,\mu)$ of both channels can be estimated by the spectral energy of each frame of $\tilde{Y}(\omega,\mu)$, as described in equations 16 and 17

$$\tilde{R}(\omega,\mu) = \tilde{Y}(\omega,\mu) - \frac{E(\mu)\tilde{Y}(\omega,\mu)}{f_\Omega} \tag{22}$$

In an exemplary embodiment, late reverberation $\tilde{R}(\omega,\mu)$ of both channels can be estimated by the spectral energy of each frame of $\tilde{Y}(\omega,\mu)$, as described in equation 18

$$\tilde{R}(\omega,\mu) = \tilde{Y}(\omega,\mu) - \frac{(\tilde{Y}(\omega,\mu))^\lambda}{f} \tag{23}$$

In an exemplary embodiment, late reverberation is considered as a statistical quantity that does not dramatically change, across different room positions in the same room. Then h(n) is modeled as a discrete non-stationary stochastic process:

$$h(n) = \begin{cases} b(n)\exp\frac{3\ln 10}{RT_{60}}n & n \geq 0, \\ 0 & n < 0. \end{cases} \tag{24}$$

where b(n) is a zero-mean stationary Gaussian noise. The short time spectral magnitude of the reverberation is estimated as:

$$\tilde{R}(\omega,\mu) = \frac{1}{\sqrt{SNR_{pri}(\omega,\mu)+1}} \tilde{Y}(\omega,\mu) \tag{25}$$

where $|SNR_{pri}(\omega,\mu)|$ is the a priori Signal to Noise Ratio that can be approximated by a moving average of the a posteriori Signal to Noise Ratio $|SNR_{post}(\omega,\mu)|$ in each frame:

$$|SNR_{pri}(\omega,\mu)|=\beta|SNR_{pri}(\omega,\mu-1)|+(1-\beta)\max(0,|SNR_{post}(\omega,\mu)-1|) \tag{26}$$

where $\beta$ is a constant taking values close to 1.

In an exemplary embodiment, the late reverberation estimation is motivated by the observation that the smearing effect of late reflections produces a smoothing of the signal spectrum in the time domain. Hence, the late reverberation power spectrum is considered a smoothed and shifted version of the power spectrum of the reverberant speech:

$$|R(\omega,\mu)|^2=\gamma\omega(\mu-\rho)*|Y(\omega,\mu)|^2 \tag{27}$$

where $\rho$ is a frame delay, $\gamma$ a scaling factor. The term $\omega(\mu)$ represents an asymmetrical smoothing function given by the Rayleigh distribution:

$$w(\mu) = \begin{cases} \frac{\mu+\alpha}{\alpha^2}\exp\left(\frac{-(\mu+\alpha)^2}{2\alpha^2}\right) & \text{if } \mu < -\alpha \\ 0 & \text{otherwise} \end{cases} \tag{28}$$

where $\alpha$ represents a constant number of frames.

In an exemplary embodiment, the short time power spectrum of late reverberation in each frame can be estimated as the sum of filtered versions of the previous frames of the reverberant signal's short time power spectrum:

$$\left|\tilde{R}(\omega,\mu)\right|^2 = \sum_{l=1}^{K} |a_l(\omega,\mu)|^2 \left|\tilde{Y}(\omega,\mu-l)\right|^2 \tag{29}$$

where K is the number of frames that corresponds to an estimation of the $RT_{60}$ and $\alpha_l(\omega,\mu)$ are the coefficients of late reverberation. The coefficients of late reverberation can be derived from $$a_l(\omega,\mu) = E\left\{\frac{\tilde{Y}(\omega,\mu)\tilde{Y}*(\omega,\mu-l)}{\left|\tilde{Y}(\omega,\mu-l)\right|^2}\right\} \tag{30}$$

After having estimated the late reverberation $\tilde{R}(\omega,\mu)$ from $\tilde{Y}(\omega,\mu)$, this estimate is used in a dereverberation process. This can be done with many techniques including spectral subtraction, Wiener filtering, etc. For example, following the spectral subtraction approach, the binaural dereverberation gain $\tilde{G}(\omega,\mu)$ will be $$\tilde{G}(\omega,\mu) = \frac{\tilde{Y}(\omega,\mu) - \tilde{R}(\omega,\mu)}{\tilde{Y}(\omega,\mu)} \tag{31}$$

Since we want to preserve the binaural localization cues, this gain is then applied separately both on the left and right channels (according for example to equation 12), in order to obtain the estimation of the dereverberated signals for the left and right ear channel respectively. In equation 15 it is shown that for specific embodiments of the present application any exponent of the frequency transformation of the reverberant signal can be used. Hence, the binaural gain can be derived from and applied to $|Y_L(\omega,\mu)|^\psi$ and $|Y_R(\omega,\mu)|^\psi$ for any $\psi$, but it can also be applied directly to the complex spectrum of left and right channels.

An example method of the present invention provides dereverberation for binaural or 2-channel systems. Spectral processing tends to produce estimation artifacts. Looking at these artifacts with respect to the dereverberation gain (see equation 12, 13, 14), there are mainly two types of errors that result:

Case I: The direct signal is incorrectly identified as reverberation. This results in low dereverberation gain values ($G_i(\omega,\mu) \to 0$), in places where the gain should have been high ($G_i(\omega,\mu) \to 1$). As a consequence the output signal suffers from severe distortions, since direct signal parts are suppressed.

Case II: reverberation parts are not located correctly and there is remaining reverberation in the output signal. These errors are originated when the method derives high dereverberation gain values ($G_i(\omega,\mu) \to 1$), in places where the gain should have been low ($G_i(\omega,\mu) \to 0$).

In exemplary embodiments of the present application, these artifacts are minimized with respect to the derived dereverberation gain. An example uses the coherence between the left and right channel as an indicator of the reverberation intrusion and modifies the original late reverberation estimation accordingly. This is an exemplary embodiment of the more general case presented in FIG. 7 and FIG. 8.

In a first step of an exemplary embodiment, the coherence $\Phi(\omega,\mu)$ between the left $Y_L(\omega,\mu)$ and the right $Y_R(\omega,\mu)$ reverberant channel is derived. The coherence can provide an estimation of distortion produced from early and late reverberation. There are many ways to calculate the coherence and they can all be used in different embodiments of the present application. As an example the coherence can be calculated as $$\Phi(\omega, \mu) = \frac{\Gamma_{LR}(\omega, \mu)}{\sqrt{\Gamma_L(\omega, \mu) \cdot \Gamma_R(\omega, \mu)}} \tag{32}$$

where:

$$\Gamma_L(\omega, \mu) = (1-a)Y_L^2(\omega, \mu) + a\Gamma_L(\omega, \mu-1), \tag{33}$$

$$\Gamma_R(\omega, \mu) = (1-a)Y_R^2(\omega, \mu) + a\Gamma_R(\omega, \mu-1), \tag{34}$$

$$\Gamma_{LR}(\omega, \mu) = (1-a)(Y_R^*(\omega, \mu)Y_L(\omega, \mu)) + a\Gamma_{LR}(\omega, \mu-1) \tag{35}$$

The coherence is (or can be) hounded in the closed interval [0,1]. Reverberation has an impact on the derived coherence values: $\Phi(\omega,\mu)$ values are smaller when reverberation is dominant and there is evidence that coherence can be seen as a measure of subjective diffuseness. Given the foregoing, we can assume that When $\Phi \to 1$ the left and right channels are similar. This means that the signals are dominated by the direct signal $\Phi \to 0$ the left and right channels are uncorrelated. This means that room interference is very significant (i.e. reverberation dominates the signals)

Note that the coherence estimation takes into account the constant changes of room acoustic conditions. These changes in room-acoustics are very significant in real-life applications, especially for the cases of moving speakers or a moving receivers.

In exemplary embodiments of the present application the above findings are used to correct the reverberation estimation errors and produce dereverberated signals without artifacts. One way to do this, is by manipulating the derived dereverberation gain and extracting a new room-adaptive gain. This room-adaptive gain modification can be performed using any relevant technique such as a function, a method, a lookup table, an equation, a routine, a system, a set of rules etc. In exemplary embodiments four gain modification schemes can be assumed:

1. The coherence is relatively low, i.e. $\Phi \to 0$ and the late reverberation estimation yields a relatively large dereverberation gain (i.e. $\tilde{G}(\omega,\mu) \to 1$). In this case, the coherence estimation reveals that late reverberation dominates the signal and the gain is decreased in order to efficiently suppress reverberation.
2. The coherence is relatively low, i.e. $\Phi \to 0$ and the late reverberation estimation yields a relatively small dereverberation gain (i.e. $\tilde{G}(\omega,\mu) \to 0$). In this case, the coherence estimation reveals that late reverberation dominates the signal and the gain is not significantly changed.
3. The coherence is relatively high, i.e. $\Phi \to 1$ and the late reverberation estimation yields a relatively large dereverberation gain (i.e. $\tilde{G}(\omega,\mu) \to 1$). In this case, the coherence estimation reveals that direct components dominate the signal and the gain is not significantly changed.
4. The coherence is relatively high, i.e. $\Phi \to 1$ and the late reverberation estimation yields a relatively small dereverberation gain (i.e. $\tilde{G}(\omega,\mu) \to 0$). In this case, the coherence estimation reveals that direct components dominate the signal and the gain is significantly increased in order to protect the signal from overestimation artifacts. Such artifacts typically appear when direct signal components are suppressed from a dereverberation method, since they are mistaken for late reverberation.

Generally speaking, the suppression of direct signal parts may result in significant distortion. This type of distortion is generally less acceptable than the reverberation degradation itself. Hence, in particular embodiments of the present applications when gain is modified, said gain increase is more drastic than said gain decrease.

In an example application, we can use the coherence estimation in order to correct the estimation errors of any dereverberation algorithm. A new room-adaptive gain is obtained through the following function:

$$G_{coh}(\omega,\mu) = (\tilde{G}(\omega,\mu)^{1-\Phi(\omega,\mu)^\gamma})^2 \tag{36}$$

where $\gamma$ is a tuning parameter. This gain can be used to obtain the dereverberated left and right signals as $$X_L(\omega,\mu) = G_{coh}(\omega,\mu)Y_L(\omega,\mu) \tag{37}$$

and $$X_R(\omega,\mu) = G_{coh}(\omega,\mu)Y_R(\omega,\mu) \tag{38}$$

Again, the derived gain can be derived from and applied to $|Y_L(\omega,\mu)|^\psi$ and $|Y_R(\omega,\mu)|^\psi$ for any $\psi$, but it can also be derived from and applied directly to the complex spectrum of left and right channels. Then the dereverberated time domain signals for the left $x_L(n)$ and right channels $x_R(n)$ can be obtained through an inverse transformation from the frequency to the time domain.

Figure 10:
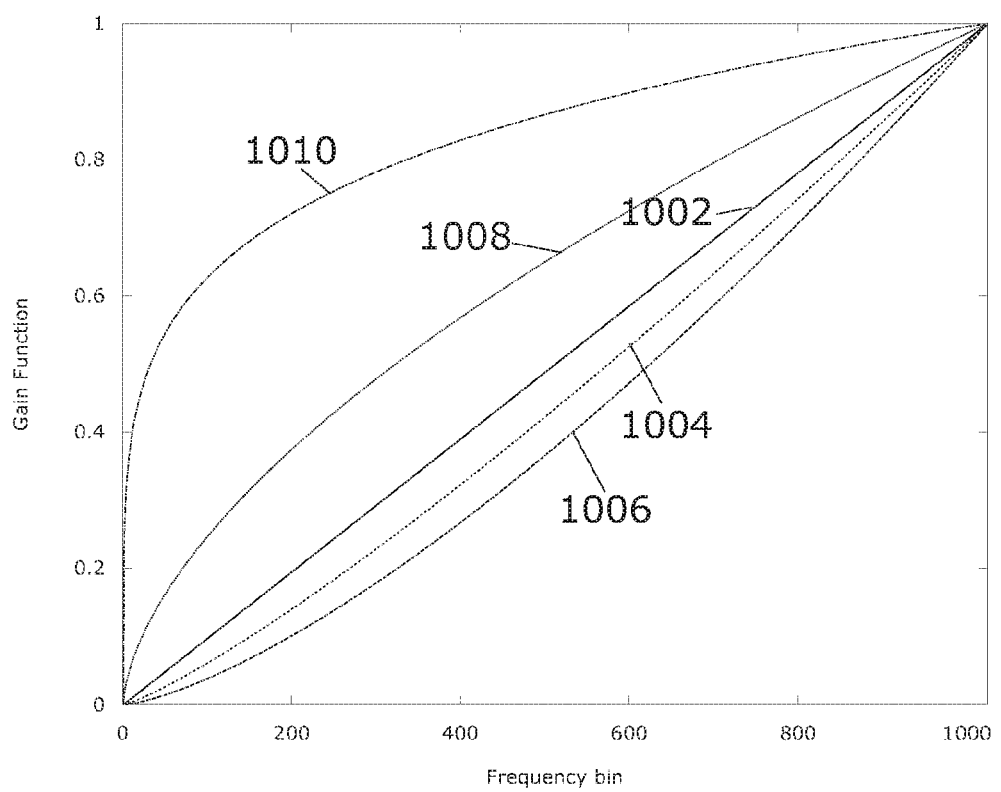
FIG. 10 illustrates an example of binaural gain functions in accordance with embodiments of the present, application.

The effect of coherence in the gain function of equation 36 is explained in the example illustrated in FIG. 10. For illustrative reasons, we assume that the first gain estimation $\tilde{G}(\omega)$ in a frame of 1024 frequency bins is given by the first order polynomial $$\tilde{G}(\omega) = \frac{1}{1024} \cdot \omega \qquad (39)$$

The first gain estimation of equation 39 1002 is shown as an example in FIG. 10. Supposing that γ=1 the new binaural dereverberation gain is shown in FIG. 10 for Φ(ω)=0.3 1006, for Φ(ω)=0.4 1004, for Φ(ω)=0.7 1008 and for Φ(ω)=0.9 1010. For small coherence values (for example when Φ(ω)<0.5), the observed signal part is believed to contain significant reverberation. Hence the first gain estimation 1002 is reduced and we increase the suppression (1004, 1006). On the contrary for higher coherence values (for example when Φ(ω)>0.5), the relevant signal part is considered to have a good SRR. Hence the first gain estimation 1002 is increased and the suppression is reduced (1008, 1010). According to equation 36; (i) when Φ(ω)=0.5 the first estimation of the gain remains intact $G_{coh}(\omega,\mu)=\tilde{G}(\omega,\mu)$ and (ii) when Φ(ω)=1 the relevant signal part is considered to contain only a direct signal and $G_{coh}(\omega,\mu)=1$. When the estimated coherence is significant, we significantly increase the calculated gain (see 1008 and 1010). By doing this, we preserve direct signal parts from incorrect suppression. On the other hand, we do not reduce the gain values (increase the suppression) with the same rate (compare for example 1004 and 1006 with 1008 and 1010). In this case, a very significant reduction of the gain values will probably introduce artifacts and thus it is avoided.

Figure 11:
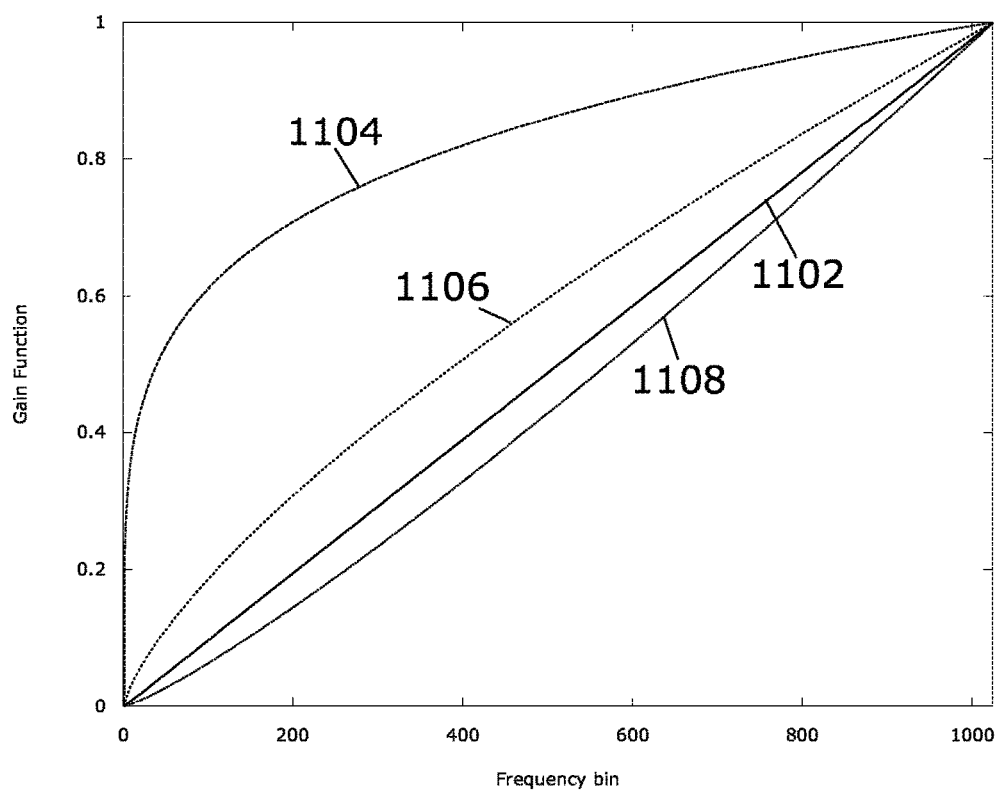
FIG. 11 illustrates an example of binaural gain functions in accordance with embodiments of the present application.

In FIG. 11 the effect of the parameter γ in equation 36 is shown. The γ parameter is used to tune the method, usually according to the room acoustics conditions and the source-receiver distance. A first gain estimation is given according to equation 39 1102. The coherence value is Φ(ω)=0.2 and the corresponding gain values for γ=0.5 1104, γ=1 1106 and γ=3 1108 are shown in FIG. 11. It is evident that bigger γ values result to a more drastic suppression. In exemplary embodiments the γ parameter may be user-defined and in other examples it can be adaptively controlled according to an estimation of the room acoustic conditions, knowledge or measurements regarding the acoustic environment, or the general need for dereverberation. For example, when using the method as a preprocessing step for improving the performance of another signal processing algorithm, bigger γ values may be chosen since a more drastic suppression is allowed. For preferred embodiments, γ values were chosen between 0 and 6.

Figure 12:
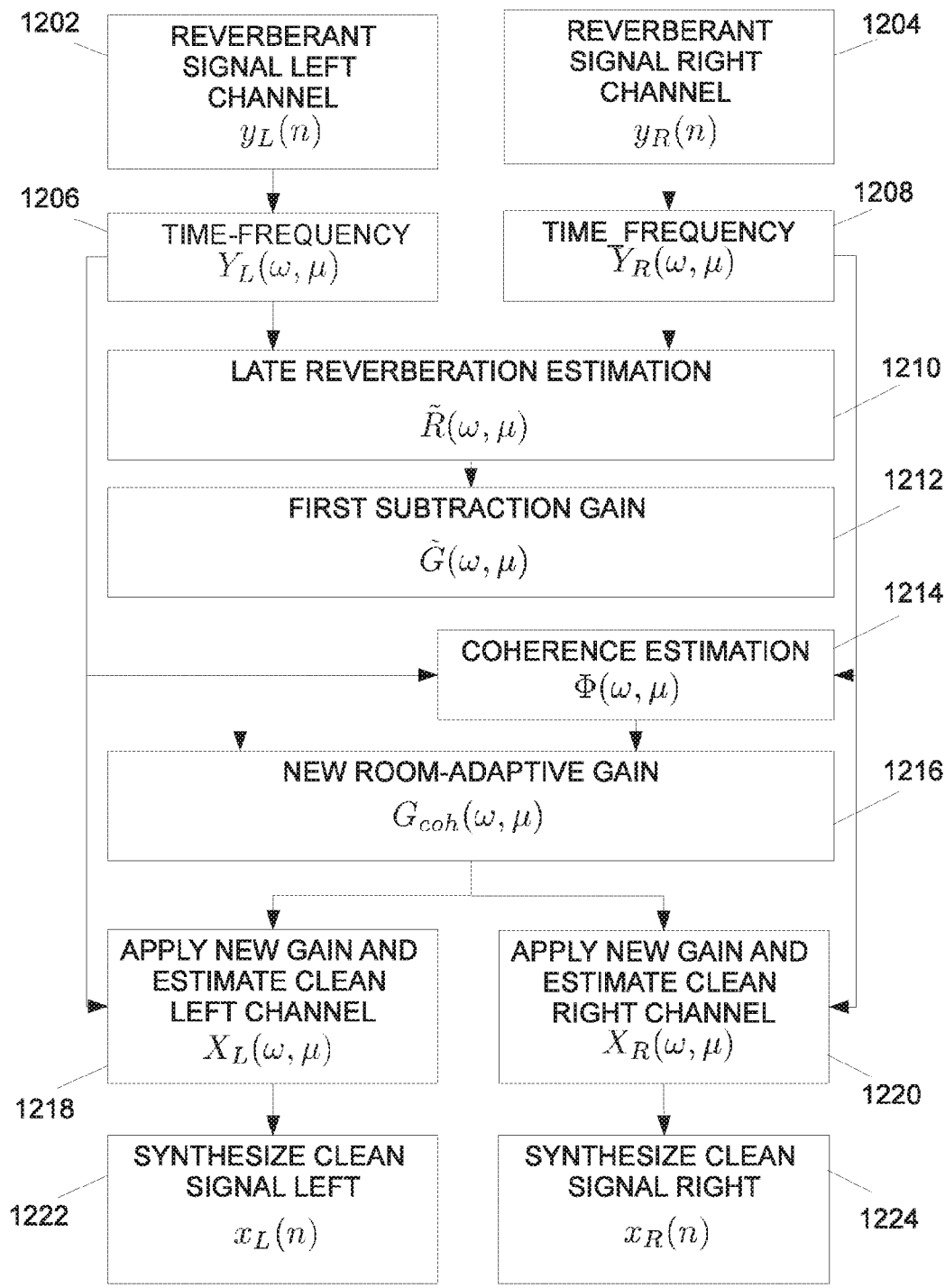
FIG. 12 illustrates a control-flow diagram of an exemplary method for reducing reverberation in binaural signals in accordance with embodiments of the present application.

In FIG. 12 a block diagram of an embodiment of the present application is described. The left 1202 and right 1204 reverberant, signal channels ($y_L(n)$ and $y_R(n)$ respectively), are transformed in the Time-Frequency domain 1206 and 1208 ($Y_L(\omega,\mu)$ and $R_R(\omega,\mu)$). Then they are combined in order to obtain a first estimation of late reverberation $\tilde{R}(\omega,\mu)$ 1210. This estimation is used to derive a first subtraction gain $\tilde{G}(\omega,\mu)$ 1212. Moreover, the coherence Φ(ω,μ) between the left and right channels (1206 and 1208) is calculated 1214. Then the coherence estimation 1214 along with the first subtraction gain 1212 are used to derive a new room-adaptive gain 1216, denoted as $G_{coh}(\omega,\mu)$. The new gain 1216 is applied, using for example equation 12, separately to the left and right reverberant frames (1218 and 1220), in order to derive the clean signal estimations for the left $X_L(\omega,\mu)$ and right channel $X_R(\omega,\mu)$. Then the estimated time domain signals ($x_L(n)$ and $x_R(n)$) are synthesized in the time-domain through any appropriate synthesis technique (1222 and 1224).

In other exemplary embodiments of the present application, the aforementioned process may be applied in any multichannel dereverberation scenario. This can be done by any appropriate technique. For example, the coherence can be calculated between consecutive pairs of input channels, or between groups of channels, etc.

In an exemplary embodiment, the amount of dereverberation is controlled, in relation to a modification of a dereverberation gain G(ω,μ). If a linear control is applied, all gain values will be equally treated:

$$G_{new}(\omega,\mu)=\zeta(G(\omega,\mu)) \qquad (40)$$

where ζ is the operator that changes the suppression rate. This linear operation is not necessarily a good choice for dereverberation. Reverberation is a convolutive degradation, it is highly correlated to the input signal and a simple linear control of the dereverberation gain might not be sufficient. In this exemplary embodiment dereverberation is controlled in accordance to the original gain values:

When there's a need for significantly reducing the suppression (i.e. increase the overall gain), the lower gain values are increased more drastically than the higher gain values. This can fix possible overestimation errors (where direct signal components are incorrectly suppressed), that are present in frequency components where a low gain was originally estimated.

When there's a need for significantly increasing the suppression (i.e. reduce the overall gain), the higher gain values are decreased more drastically than the lower gain values. This prevents the frequency components assigned with a low gain from overestimation errors.

In typical examples, the dereverberation gain is increased at a higher rate than it is decreased. In some applications, the above dereverberation gain can be controlled automatically and fine-tuned according to the acoustic conditions. In other applications, it can be user-defined permitting for example to a hearing aid user to adapt the dereverberation rate to his specific needs.

Figure 13:
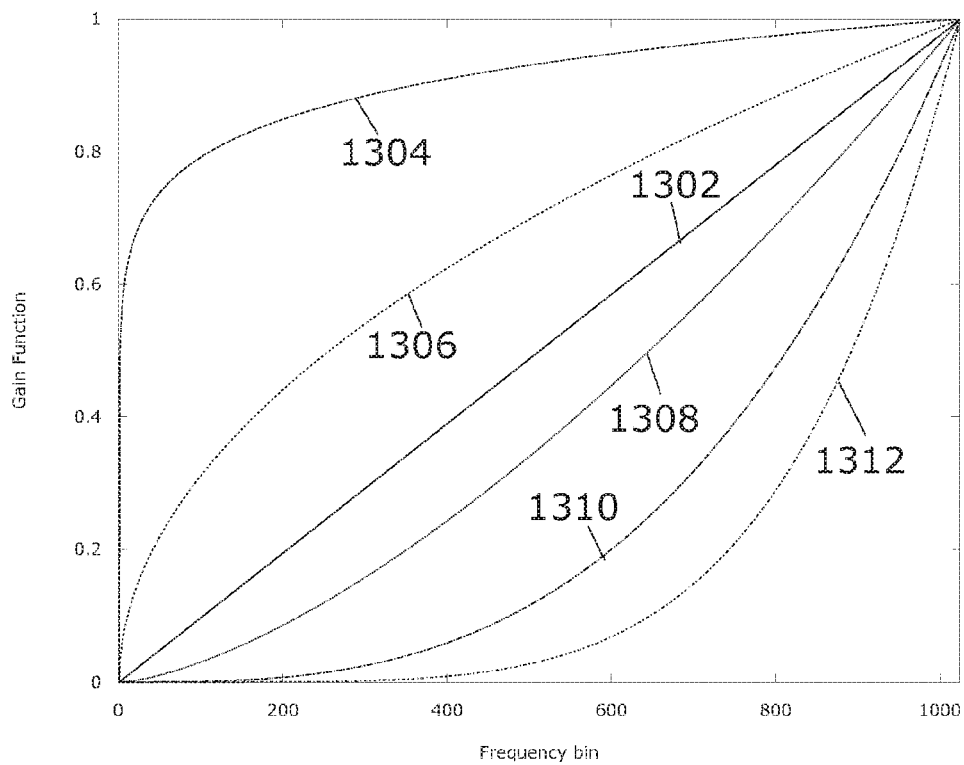
FIG. 13 illustrates an example of gain functions used for controlling the reverberation suppression rate in accordance with embodiments of the present application.

In an example, the gain function of a dereverberation filter G(ω,μ) is controlled through a parameter ν, in order to extract a new filter $G_{new}(\omega,\mu)$ as $$G_{new}(\omega,\mu)=(G(\omega,\mu))^\nu \qquad (41)$$

where ν>0. In FIG. 13 the effect of equation 41 is illustrated. For illustrative reasons, the original gain G(ω,μ), 1302 is derived from equation 39. FIG. 13 illustrates the new gain $G_{new}(\omega,\mu)$ for ν=0.1 1304, for ν=0.5 1306, for ν=1.5 1308, for ν=3 1310 and for ν=5 1312. According to equation 41 the original gain is increased for ν<1 and reduced for ν>1. In addition, not all gain values are treated equally. The parameter ν that controls the suppression rate can be user-defined or automatically adjusted.

Even though embodiments of the present invention are related to the suppression of late reverberation, the methods presented in this application are also appropriate for the suppression of ambient noise. All assumptions made for late reverberation in the diffuse field (e.g. stationarity, stochastic characteristics, noise-like) broadly stand for ambient noise. Hence, the embodiments presented in this application inherently suppress both ambient noise and late reverberation and they are valid for ambient noise reduction as well.

Figure 14:
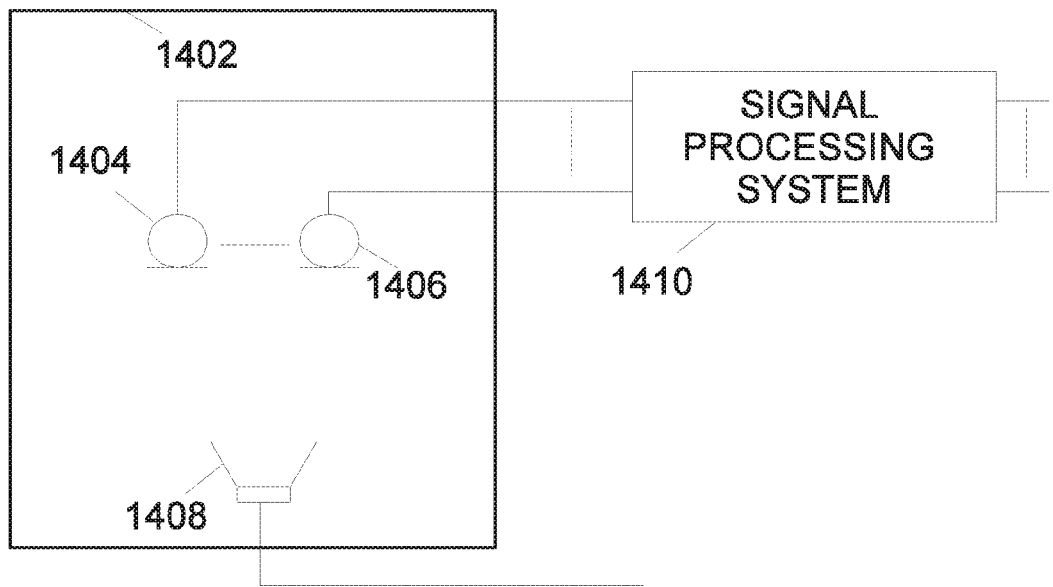
FIG. 14 illustrates an example of a reverberant environment and a dereverberation signal processing system arranged in accordance with embodiments of the present application.

FIG. 14 illustrates a an exemplary representation of a dereverberation system that works in accordance with embodiments of the present application. An arbitrary number of microphones (1404 and 1406) are capturing the reverberant sound emitted by one or more sound sources (here represented by a loudspeaker 1408) inside a reverberant space 1402. The microphone outputs are fed into the dereverberation unit 1410, where they are processed according to embodiments of the present application. The signal processing system that performs dereverberation 1410 may also perform other signal processing tasks such as echo cancellation, beamforming, denoising, source separation, equalization, etc. The signal processing system 1410 may have one or more outputs and it can be located inside or outside the reverberant environment 1402, or it can be portable. In practice, the dereverberation system can be any electronic device, including but not limited to: hearing aid devices, ear phones, mobile phones, active ear protection systems, public address systems, teleconference systems, hands-free devices, automatic speech recognition systems, multimedia software and systems, systems for professional audio, dect phones, desktop and laptop or portable computers, tablets, embedded electronic devices, appliances. It will be understood and is appreciated by persons skilled in the art, that one or more processes, sub-processes or process steps described in embodiments of the present invention can be implemented in hardware and/or software.

While the above-described flowcharts have been discussed in relation to a particular sequence of events, it should be appreciated that changes to this sequence can occur without materially effecting the operation of the invention. Additionally, the exemplary techniques illustrated herein are not limited to the specifically illustrated embodiments but can also be utilized and combined with the other exemplary embodiments and each described feature is individually and separately claimable.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively the disclosed methods may be readily implemented in software on an embedded processor, a micro-processor or a digital signal processor. The implementation may utilize either fixed-point or floating point operations or both. In the case of fixed point, operations, approximations may be used for certain mathematical operations such as logarithms, exponentials, etc. Alternatively, the disclosed system may be implemented partially or fully in hardware using standard logic circuits or VLSI design. Whether software or hardware is used to implement the systems in accordance with this invention is dependent, on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

It is therefore apparent that there has been provided, in accordance with the present invention, systems and methods for reducing reverberation in electronic devices. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed:

1. A method, in a multimedia signal processing system, that allows a user to adjust suppression of reverberation or noise from a digital signal that represents a sound signal, comprising:

analyzing the digital signal by determining a plurality of time-frequency frames of the digital signal;

deriving a first estimation of reverberation or noise from one of the frames in a first time instant;

deriving a first suppression gain from the first estimation;

selecting, by the user, a first exponent from a predetermined set of exponents;

deriving a modified first suppression gain based on the first suppression gain raised to a power related to the first exponent;

wherein the modified first suppression gain is applied to the one frame in the first time instant;

deriving a second estimation of reverberation or noise from one of the frames in a second time instant;

deriving a second suppression gain from the second estimation;

selecting, by the user, a second exponent from a predetermined set of exponents;

deriving a modified second suppression gain based on the second suppression gain raised to a power related to the second exponent;

wherein the modified second suppression gain is applied to the one frame in the second time instant;

outputting a signal that involves processing the frame in the first time instant utilizing the first modified suppression gain;

and outputting a signal that involves processing the frame in the second time instant utilizing the second modified suppression gain;

wherein the first exponent and the second exponent are different from one another, and
wherein the second time instant is subsequent to the first time instant.

2. The method of claim 1, where the multimedia signal processing system is realized in a computer.

3. The method of claim 1, where the multimedia signal processing system implements a multimedia software system.

4. The method of claim 1, wherein the first and second time instants partially overlap one another.

5. The method of claim 1, wherein the digital signal is single channel or multi-channel or stereo or binaural.

6. The method of claim 1, wherein the sound signal is part of a multimedia signal.

7. The method of claim 1, wherein the time-frequency frames are determined using a short-time Fourier transform (STFT) or a wavelet transform or a polyphase filterbank or a multi rate filterbank or a quadrature mirror filterbank or a warped filterbank or an auditory-inspired filterbank.

8. A system to allow a user to adjust suppression of reverberation or noise from a digital signal that represents a sound signal, comprising:
a multimedia signal processing system that is capable of processing a digital signal related to the sound signal and adapted to:
analyze the digital signal by determining a plurality of time-frequency frames of the digital signal;
derive a first estimation of reverberation or noise from one of the frames in a first time instant;
derive a first suppression gain from the first estimation;
select, by the user, a first exponent from a predetermined set of exponents;
derive a modified first suppression gain based on the first suppression gain raised to a first power related to the first exponent;
wherein the modified first suppression gain is applied to the one frame in the first time instant;
derive a second estimation of reverberation or noise from one frame in a second time instant;
derive a second suppression gain from the second estimation;
select, by the user, a second exponent from a predetermined set of exponents;
derive a modified second suppression gain based on the second suppression gain raised to a second power related to the second exponent;
wherein the modified second suppression gain is applied to the one frame in the second time instant;
output a signal that involves processing the frame in the first time instant utilizing the first modified suppression gain; and
output a signal that involves processing the frames in the second time instant utilizing the second modified suppression gain;
wherein the first exponent and the second exponent are different from one another, and
wherein the second time instant is subsequent to the first time instant.

9. The system of claim 8, where the multimedia signal processing system is realized in a computer.

10. The system of claim 8, where the multimedia signal processing system implements a multimedia software system.

11. The system of claim 8, wherein the first and second time instants partially overlap one another.

12. The system of claim 8, wherein the digital signal is single channel or multi-channel or stereo or binaural.

13. The system of claim 8, wherein the time-frequency frames are determined using a short-time Fourier transform (STFT) or a wavelet transform or a polyphase filterbank or a multi rate filterbank or a quadrature mirror filterbank or a warped filterbank or an auditory-inspired filterbank.

14. The system of claim 8, wherein the sound signal is part of a multimedia signal.

15. A non-transitory information storage media having stored thereon instructions, what when executed by one or more processors in a multimedia signal processing system, cause to be performed a method that allows a user to adjust suppression of reverberation or noise from a digital signal that represents a sound signal, comprising:
analyzing the digital signal by determining a plurality of time-frequency frames of the digital signal;
deriving a first estimation of reverberation or noise from one of the frames in a first time instant;
deriving a first suppression gain from the first estimation;
selecting, by the user, a first exponent from a predetermined set of exponents;
deriving a modified first suppression gain based on the first suppression gain raised to a power related to the first exponent;
wherein the modified first suppression gain is applied to the one frame in the first time instant;
deriving a second estimation of reverberation or noise from one of the frames in a second time instant;
deriving a second suppression gain from the second estimation;
selecting, by the user, a second exponent from a predetermined set of exponents;
deriving a modified second suppression gain based on the second suppression gain raised to a power related to the second exponent;
wherein the modified second suppression gain is applied to the one frame in the second time instant;
outputting a signal that involves processing the frame in the first time instant utilizing the first modified suppression gain;
and outputting a signal that involves processing the frame in the second time instant utilizing the second modified suppression gain;
wherein the first exponent and the second exponent are different from one another, and
wherein the second time instant is subsequent to the first time instant.

16. The media of claim 15, where the multimedia signal processing system is realized in a computer.

17. The media of claim 15, where the multimedia signal processing system implements a multimedia software system.

18. The media of claim 15, wherein the first and second time instants partially overlap one another.

19. The media of claim 15, wherein the digital signal is single channel or multi-channel or stereo or binaural.

20. The media of claim 15, wherein the time-frequency frames are determined using a short-time Fourier transform (STFT) or a wavelet transform or a polyphase filterbank or a multi rate filterbank or a quadrature mirror filterbank or a warped filterbank or an auditory-inspired filterbank.

21. The media of claim 15, wherein the sound signal is part of a multimedia signal.

* * * * *